United States Patent [19]

Wolf

(10) Patent No.: US 6,567,976 B1
(45) Date of Patent: May 20, 2003

(54) METHOD FOR UNROLLING TWO-DEEP LOOPS WITH CONVEX BOUNDS AND IMPERFECTLY NESTED CODE, AND FOR UNROLLING ARBITRARILY DEEP NESTS WITH CONSTANT BOUNDS AND IMPERFECTLY NESTED CODE

(75) Inventor: Michael Wolf, London (GB)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 08/822,927

(22) Filed: Mar. 20, 1997

(51) Int. Cl.[7] .............................................. G06F 9/45
(52) U.S. Cl. ......................... 717/160; 717/154; 717/161
(58) Field of Search ................................ 717/152, 154, 717/155, 156, 150, 160, 161

(56) References Cited

U.S. PATENT DOCUMENTS

| 5,442,790 A | | 8/1995 | Nosenchuck | 717/155 |
|---|---|---|---|---|
| 5,485,619 A | | 1/1996 | Lai et al. | 717/150 |
| 5,491,823 A | * | 2/1996 | Ruttenberg | 395/709 |
| 5,535,393 A | | 7/1996 | Reeve et al. | 717/149 |
| 5,752,037 A | * | 5/1998 | Gornish et al. | 717/160 |
| 5,790,859 A | | 8/1998 | Sarkar | 717/130 |
| 5,802,375 A | * | 9/1998 | Ngo et al. | 717/160 |
| 5,805,863 A | * | 9/1998 | Chang | 395/500 |
| 5,809,308 A | | 9/1998 | Tirumalai | 717/161 |
| 5,822,593 A | * | 10/1998 | Lamping et al. | 395/709 |
| 5,842,022 A | | 11/1998 | Nakahira et al. | 717/160 |
| 5,862,384 A | | 1/1999 | Hirai | 717/160 |
| 5,867,711 A | | 2/1999 | Subramanian et al. | 717/161 |
| 5,910,900 A | | 6/1999 | Mangelsdorf | 703/6 |
| 5,920,724 A | | 7/1999 | Chang | 717/161 |
| 5,930,507 A | | 7/1999 | Nakahira et al. | 717/160 |
| 5,940,620 A | | 8/1999 | Graham | 717/158 |
| 5,956,498 A | | 9/1999 | Mangelsdorf | 716/2 |
| 6,226,790 B1 | * | 5/2001 | Wolf et al. | 717/135 |

OTHER PUBLICATIONS

Wolf et al, "Combining Loop Transformations Considering Caches and Scheduling," MICRO–29, Proceedings of the 29th Annual IEEE/ACM International Symposium, pp. 274–286, Dec. 1996.*

Wolf et al, "A Data Locality Optimizing Algorithm," ACM SIGPLAN, PLDI '91, Proceedings of the conference on Programming language design and implementation, vol. 26, No. 6, pp. 30–44, Jun. 1991.*

(List continued on next page.)

Primary Examiner—Tuan Q. Dam
(74) Attorney, Agent, or Firm—Sterne, Kessler, Goldstein & Fox P.L.L.C.

(57) ABSTRACT

A compiler for compiling source code whereby the compiled source code is optimized by performing outer loop unrolling (a generalization of "unroll and jam" on selected loop nests. The present invention allows any arbitrarily deep loop nests with non-varying loop bounds to be properly unrolled even in the presence of imperfectly nested code. This is accomplished for two-deep loop nests by transforming the code into multiple adjacent loop nests. In the transformed code, the imperfect code is isolated so that one of the adjacent loops nests has none, and thus can be unrolled and jammed. For three-deep or greater loop nests, the process is repeated recursively from the outer-most loop. The present invention also allows outer loop unrolling for two-deep loop nests with convex bounds, even with the presence of imperfectly nested code. This is accomplished by identifying strips of code which do not contain imperfectly nested code. An unroll and jam operation is executed for the identified strips. Code falling outside of the identified strips as well as wind-down code, are executed according to their original, untransformed order.

6 Claims, 4 Drawing Sheets

OTHER PUBLICATIONS

Carr et al, "Improving Software Pipelining With Unroll–and–Jam," Proceedings of the Twenty–Ninth Hawaii International Conference on System Sciences, vol. 1, pp. 183–192, Jan. 1996.*

Carter, L. et al., "Hierarchical Tiling for Improved Superscalar Performance," IEEE, Apr. 1995, pp. 239–245.

Lam, M. et al., "The Cache Performance and Optimizations of Blocked Algorithms," Fourth International Conference on Architectural Support for Programming Languages and Operating Systems, Apr. 8–11, 1991, pp. 63–74.

Punyamurtula, S. and Chaudhary, V., "Minimum Dependence Distance Tiling of Nested Loops with Non–uniform Dependences," Proceedings of the Sixth IEEE Symposium on Parallel and Distributed Processing, IEEE, Oct. 26–29, 1994, Dallas, Texas, pp. 74–81.

Torrellas, J. et al., "Optimizing Instruction Cache Performance for Operating System Intensive Workloads," Proceedings of the First IEEE Symposium on High–Performance Computer Architecture, IEEE, Jan. 22–25, 1995, pp. 360–369.

* cited by examiner

METHOD FOR UNROLLING TWO-DEEP LOOPS WITH CONVEX BOUNDS AND IMPERFECTLY NESTED CODE, AND FOR UNROLLING ARBITRARILY DEEP NESTS WITH CONSTANT BOUNDS AND IMPERFECTLY NESTED CODE

FIELD OF THE INVENTION

The present invention pertains to a method for optimizing source code by a compiler so that the resulting compiled code can be run much faster. More particularly, the present invention relates to a method for unrolling two-deep loops with convex bounds and imperfectly nested code, and for unrolling arbitrarily deep nests with constant bounds and imperfectly nested code.

BACKGROUND OF THE INVENTION

Computers are being used today to perform a wide variety of tasks. Many different areas of business, industry, government, education, entertainment, and most recently, the home, are tapping into the enormous and rapidly growing list of applications developed for today's increasingly powerful computer devices. Computers have also become a key technology for communicating ideas, data, and trends between and among business professionals. These devices have become so useful and ubiquitous, it would be hard to imagine today's society functioning without them.

Computers operate by executing programs, or a series of instructions stored in its memory. These programs, and their series of instructions, are collectively referred to as software. Software is key to utility of computers. Software is what makes the computer devices function and perform useful tasks. Efficient software makes for effective machines, whereas inefficient software makes for difficult to use, less effective, slower machines. Thus, the utility of the computer device often hinges upon the quality of the software written for the device.

Initially, software is crafted by professionals referred to as programmers or software engineers. As programs have become larger and more complex, the task of writing software has become correspondingly more difficult. As a result, programmers typically code in "high level languages" to improve productivity. The use of high level language makes the task of writing extremely long and complex programs more manageable. The completed program, however, must eventually be translated into machine executable language in order to run on a computer. The process of translating the program written in high level language into a program written in machine language is referred to as compiling. The actual translation is performed by a software program referred to as a compiler. Programmers rely upon compilers to translate their programs which are written in high level language (e.g., Basic, Fortran, C++, Pascal, etc.) into a program comprised of machine executable code, known as "machine language."

Basically, the compiler operates on the program written in high level language. The high level language program is referred to as source code. The compiler translates the source code into machine executable code. Ultimately, it is the machine executable code which will run on the computer. The speed and reliability of the executable code depends upon the sophistication of the compiler, i.e. how it "optimizes". If the compiler is unsophisticated, the size of the executable code will be larger than necessary. Worse, execution speed and reliability, may also be affected. Hence, it is critical to the speed and efficiency of the program that the compiler thoroughly optimize the executable code during the translation process.

There are several different methods and techniques used to optimize source code for scientific applications, loop interchange, cache tiling or blocking, etc. The present invention pertains to an improved variation for performing an optimization technique commonly referred to as "unroll and jam." With the prior art technique, perfectly nested loop nests with constant loop bounds in source code can be compiled more efficiently. A "loop" refers to a sequence of steps which is repeated over and over again until a condition is satisfied. Often, source code contains nested loops whereby an inner loop is executed as part of the sequence of steps within an outer loop. Nested loops, under certain circumstances, may be "unrolled and jammed" such that it produces an equivalent result, yet the total number of load or store operations is reduced. Load and store operations are costly because it takes a relatively long period of time to load and store data into the appropriate registers. Consequently, reducing the number of load and store operations increases the speed at which a compiled code can run.

An example is now offered to demonstrate the prior art unroll and jam operation. The following source code shows a two-deep perfectly nested loop:

```
DO i=1, N1
    DO j=1, N2
        a(i)=a(i) + b(j)
    ENDDO
ENDDO
```

Each time through the inner "DO" loop, the same a(i) variable is used, but a different b(j) must be loaded. Hence, a separate load operation must be performed each time the statement "a(i)=a(i)+b(j)" is executed. The outer loop can be unrolled as follows:

```
DO i=1, N1-1, 2
    DO j=1 to N2
        a(i)=a(i) + b(j)
    ENDDO
    DO j=1, N2
        a(i+1)=a(i+1) + b(j)
    ENDDO
ENDDO
IF (i.eq.N1) THEN
    DO j=1, N2
        a(i)=a(i)+b(j)
    ENDDO
ENDIF
```

By unrolling the "i" loop once, the same result is achieved. The difference is that the "i" loop is now stepping by two. Note that the unrolling process described above does not result in any changes to the statements. All statements are executed in the same order as before: (1,1), (1,2), . . . (1,N), (2,1), (2,2), . . . (2,N). The purpose for unrolling the source code is to prepare it for the jamming process. It should be noted that stepping by two poses a couple of problems. First, it must be ensured that the unrolled code does not overshoot and perform an extra step. Hence, one is subtracted from the upper bounds (N1−i). Second, there must be a mechanism for handling the case if N1 is odd. This is accomplished by implementing a wind-down loop. The wind-down loop executes the last step in case N1 is odd.

After unrolling, the source code is optimized by applying a "jamming" procedure. Jamming as applied to the above example produces the following code:

```
DO i=1, N1-1, 2
    DO j=1, N2
        a(i)=a(i) + b(j)
        a(i+1)=a(i+1) + b(j)
    ENDDO
ENDDO
IF (i.eq.N1) THEN
    DO j=1, N2
        a(i)=a(i)+b(j)
    ENDDO
ENDIF
```

By jamming the two "j" loops into a single loop, the computation has been changed. Instead of performing (1,1), (1,2), . . . , (1,N), (2,1), (2,2), . . . (2,N); the new process runs (1,1), (2,1), (1,2), (2,2), (3,1), (3,2), etc. Now, b(1) which was used by both (1,1) and (2,1), no longer has to wait for the N iterations of "j" to happen. It can be loaded for (1,1) and used without having to be reloaded for (2,1). This is due to the fact that (1,1) and (2,1) occur one right after the other. Hence, jamming effectively reduces the total number of loads. In effect, the jamming procedure combines the unrolled loops. As a result, the unrolled and jammed version runs much faster than the original source code.

However, prior art unroll and jam procedures are limited to code having both constant loop bounds and whose loops also happen to be perfectly nested as well. Both of these are very strong restrictions. First non-constant loop boundaries (e.g. in the above example, if the loop bounds for the j loop had depended on i) are frequently found in source code. Second, it is very common for these to be statements nested in the outer loop, but not loops further in.

Thus, there is a need in the prior art for a compiler that can unroll and jam the more general case of source code having variable loop boundaries and non-perfectly nested statements. The present invention provides an elegant solution to these problems in important cases by implementing an "outer loop unrolling" process. With the present invention, source code which normally cannot be unrolled and jammed, can now be optimized by an outer loop unrolling process to reduce the total number of load and store operations. Specifically, in the case of doubly nested loops (i.e., 2D loop nests), both restrictions are relaxed. In other words, the code may be imperfectly nested with loop bounds of any linear convex configuration, and be outer unrolled. Since two-deep nests are by far the more common case and since it is extremely common that bounds are not constant but are linear convex, the present invention offers a very important extension to prior art optimization techniques. Furthermore, this present invention can be applied to loop nests of any depth with constant bounds, and, unlike with the prior art, the loop nest need not be perfectly nested. Since loop nests are typically not perfectly nested, this also is a very significant extension to the prior art.

SUMMARY OF THE INVENTION

The present invention pertains to a compiler for compiling source code whereby the compiled source code is optimized by performing unroll and jam on selected loop nests. The present invention allows any arbitrarily deep loop nests with constant bounds to be properly unrolled, even those loop nests having imperfectly nested code. This is accomplished by transforming the code into multiple loops. In the transformed code, the imperfect code is isolated in one of the loops while the other loops are placed in a condition such that a conventional unroll and jam operation may be applied. For three-deep or greater loop nests, the process is repeated recursively from the outer-most loop.

The present invention also allows outer loop unrolling for two-deep loop nests not only with imperfectly nested code, but also with convex bounds. This is accomplished by identifying strips of code which do not contain imperfectly nested code. An unroll and jam operation is executed for the identified strips. Code falling outside of the identified strips as well as wind-down code, are executed according to their original untransformed order.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
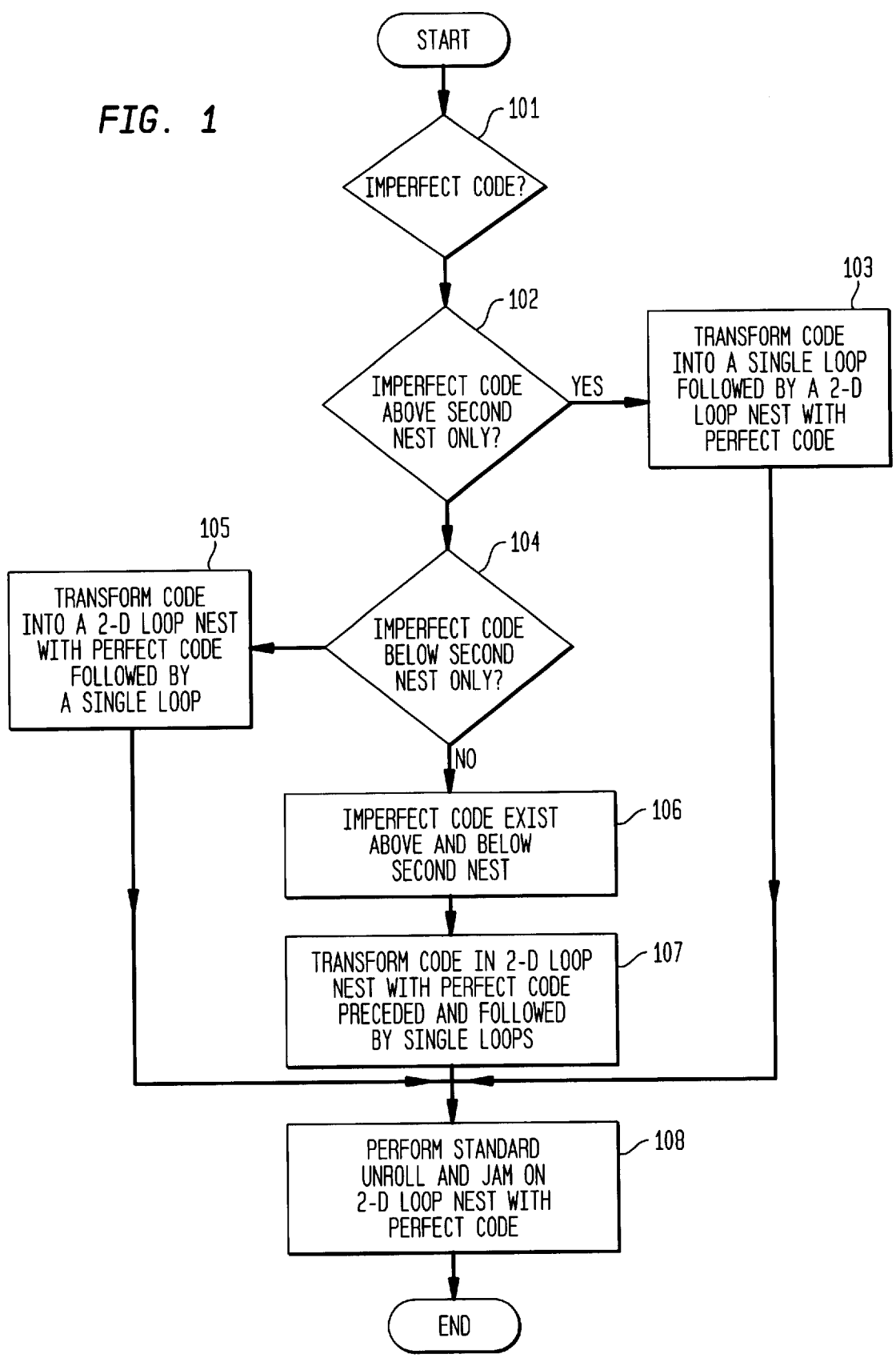
FIG. 1 is a flowchart describing the steps for outer loop unrolling any two-deep loop with constant bounds, even those having imperfect code.

A method for unrolling convex and non-perfectly looped nests for use in a compiler is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention pertains to a method for performing a generalization of unroll and jam that we call outer loop unrolling. Outer loop unrolling improves the performance of software by reducing the number of requisite load and store operations. The present invention is capable of unrolling outer loops, even when the nest is not perfectly nested and. for two deep nests, even when the bounds are non-constant as well too deep. The compiler of the present invention is especially effective on scientific code (e.g., code having loops with array references).

The first aspect of the present invention pertaining to the optimization of source code having constant bounds and imperfect code is now described. Imperfect code pertains to a statement which is does not reside within both of the loops. The following imperfect code is offered as an example:

```
DO i=1, 4
    c(i)=c(i)+3
    DO j=1,7
        a(i)=a(i)+b(j)
    ENDDO
ENDDO
```

It can be seen that the c(i)=c(i)+3 statement resides within the outer "i" loop, but falls outside the inner "j" loop. The imperfect code can be thought of as having executed in the first iteration of "j." The above code was not written in this way, but if it had been, it would have given the same result:

```
            DO i=1, 4
              DO j=1, 7
                if (j .eq. 1) then c(i)=c(i)+3
                a(i)=a(i)+b(j)
              ENDDO
            ENDDO
```

If the tiling dependence conditions are met on this nest, then it is perfectly legal to rewrite the code as:

```
            DO i=N1, N2
              S1(i)
              DO j=N3, N4
                S2(i, j)
              ENDDO
            ENDDO
```

Rearranging this code produces:

```
            DO i=1, 4
              c(i)=c(i)+3
              a(i)=a(i)+b(j)
            ENDDO
            DO i=1,4
              DO j=2, 7
                a(i)=a(i)+b(j)
              ENDDO
            ENDDO
```

It can be seen that the second loop nest has constant bounds and is also perfectly nested. The second loop nest is referred to as a "synchronized" loop. Using the prior art, it is in proper condition to be jammed. Thus, the present invention has successfully unrolled and jammed this nonperfectly nested loop by transforming it into a perfectly nested loop and then jamming.

The example given above can be applied to any general case as follows. Any code of the form:

```
            DO i=N1, N2
              S1(i)
              DO j=N3, N4
                S2(i,j)
              ENDDO
            ENDDO
``` may be replaced by:

```
            DO i=N1, N2
              S1(i)
              S2(i, N3)
            ENDDO
            DO i=N1, N2
              DO j=N3+1, N4
                S2(i,j)
              ENDDO
            ENDDO
``` so long as N3 is less than or equal to N4. This condition can be verified or tested during runtime to ensure proper compliance.

The above description describes the entire algorithm for unrolling an imperfectly nested 2D loop with constant bounds when the imperfect code is above the second nest. If the imperfect code is below the second nest, the transformation is analogous. However, if there exist imperfect code both above and below the nest:

```
            DO i=N1, N2
              S1(i)
              DO j=N3, N4
                S2(i,j)
              ENDDO
              S3(i)
            ENDDO
``` it can be replaced with the following code:

```
            DO i=N1, N2
              S1(i)
              S2(i, N3)
            ENDDO
            DO i=N1, N2
              DO j=N3+1, N4-1
                S2(i,j)
              ENDDO
            ENDDO
            DO i=N1, N2
              S2(i, N4)
              S3(i)
            ENDDO
```

The middle of these three loop nests, which typically contains the majority of the computation, may now be properly unrolled and jammed using the prior art. Thus, the present invention grants the compiler the capability to outer loop unroll any 2D loop with constant bounds, even if the code is imperfectly nested.

FIG. 1 is a flowchart describing the steps for outer loop unrolling any code identified to be a two-deep loop with constant bounds and imperfect code. If such a case is encountered during the compilation process, the compiler checks to determine whether there exist any imperfect code, step 101. Imperfect code include any statement which does not reside within both of the loops. If there are no imperfect code, the compiler simply performs a standard unroll and jam operation, step 108. However, if there exist imperfect code, the entire loop nest is transformed. If the imperfect code is above the second nest only, step 102, then it is transformed into a single loop followed by a 2D loop nest with perfect code according to step 103. If the imperfect code only exists below the second nest as determined by step 104, then the code is transformed into a 2-D loop nest with perfect code followed by a single loop nest, step 105. Step 106 represents the case whereupon the imperfect code is found both above and below the second nest. In this case, the code is transformed into a 2-D loop nest with perfect code which is straddled by single loop nests, step 107. In step 108, the 2-D loop nest with perfectly nested statements is unrolled and jammed.

The above description discloses how the present invention accomplishes unroll and jam for any two deep loop with constant bounds, even if imperfectly nested. Now, this technique is extended to cover any nest depth greater than two, even if imperfectly nested, so long as the bounds are constant. To do this, however, requires applying the above technique recursively. The following three-deep example is now offered for purposes of explanation:

```
DO i = N1, N2
    S1 (i)
    DO j = N3, N4
        S2 (i, j)
        DO k = N5, N6
            S3 (i, j, k)
        ENDDO
    ENDDO
ENDDO
```

First, the same technique as described above is applied to the outermost two loops. That is, everything inside the "j" loop is treated as a single unit. So, applying the example above to loops "i" and "j" below yields:

```
DO i = N1, N2
    S1 (i)
    S2 (i, N3)
    DO k=N5, N6
        S3(i,N3,k)
    ENDDO
ENDDO
DO i = N1, N2
    DO j = N3 +1, N4
        S2(i, j)
        DO k = N5, N6
            S3 (i, j, k)
        ENDDO
    ENDDO
ENDDO
```

One can now apply a slightly unusual version of unroll-and-jam to the "i" loop, which is legal so long as tiling is legal. Let us illustrate with outer unrolling the i loop only once:

```
DO i = N1, N2
    S1 (i)
    S2 (i, N3)
    DO k=N5, N6
        S3(i,N3,k)
    ENDDO
ENDDO
DO i = N1, N2, 2
    DO j = N3 + 1, N4
        S2 (i,j)
        S2 (i +1, j)
        DO k = N5, N6
            S3 (i, j, k)
            S3 (i +1, j, k)
        ENDDO
    ENDDO
ENDDO
if (i .eq. N2) then
    DO j = N3+1, N4
        S2 (i, j)
        DO k = N5, N6
            S3 (i, j, k)
        ENDDO
    ENDDO
ENDIF
```

Now the inner two loops of the (i, j, k) nest (i.e., the "j" and "k" loops) are imperfect with constant bounds. This can be outer loop unrolled with the technique already described above. And it already contains two iterations of the "i" loop. Thus, one can apply the same technique to that loop, completing the unrolling and achieving the goal of outer loop unrolling both the "i" and "j" loops. To finish the example, given below is the complete code:

```
DO i = N1, N2
    S1 (i)
    S2 (i, N3)
    DO k=N5,N6
        S3(j,N3,k)
    ENDDO
ENDDO
DO i = N1, N2, 2
    DO j = N3+1, N4
        S2 (i, j)
        S2 (i+1, j)
        S3(i, j, N5)
        S3 (i+1, j, N5)
    ENDDO
    DO j = N3+1, N4, 2
        DO k = N5+1, N6
            S3 (i, j, k)
            S3 (i+1, j, k)
            S3 (i, j+1, k)
            S3 (i+1, j+1, k)
        ENDDO
    ENDDO
ENDDO
IF (j. eq.N4) THEN
    S2(i, j)
    S2(i+1, j)
    DO k = N5+1, N6
        S3 (i, j, k)
        S3 (i, j, k)
    ENDDO
ENDIF
ENDDO
IF (i . eq. N2) THEN
    DO j = N3+1, N4
        S2 (i,j)
        DO k = N5, N6
            S3 (i, j, k)
        ENDDO
    ENDDO
ENDIF
```

The entire algorithm works as follows. Given a loop nest, imperfectly nested but with constant bounds, first, from the outside in, optimize as follows. Without loss of generality, every loop nest is of the form:

```
DO i = N1, N2
    DO j = N3, N4
        S(i,j)
    ENDDO
ENDDO
```
or
```
DO i = N1, N2
    S1 (i)
    DO j = N3, N4
        S(i, j)
    ENDDO
ENDDO
```
or
```
DO i = N1, N2
    DO j = N3, N4
        S (i, j)
    ENDDO
    S3 (i)
ENDDO
```
or
```
DO i = N1, N2
    S1 (i)
    DO j = N3, N4
        S (i, j)
    ENDDO
    S3 (i)
ENDDO
``` where the S(i, j) actually may contain loops further in. In each of these cases, according to the previous discussion, the exact code to outer unroll is known. Second, there may be wind-up and/or wind-down loops. Do not optimize those. Instead, consider only the single remaining non-wind-up non-wind-down loop. Thirdly, if that nest has two or more perfectly nested or non-perfectly nested loops inside it, optimize using the same technique. This algorithm has been illustrated already on the three-deep example given above.

Figure 2:
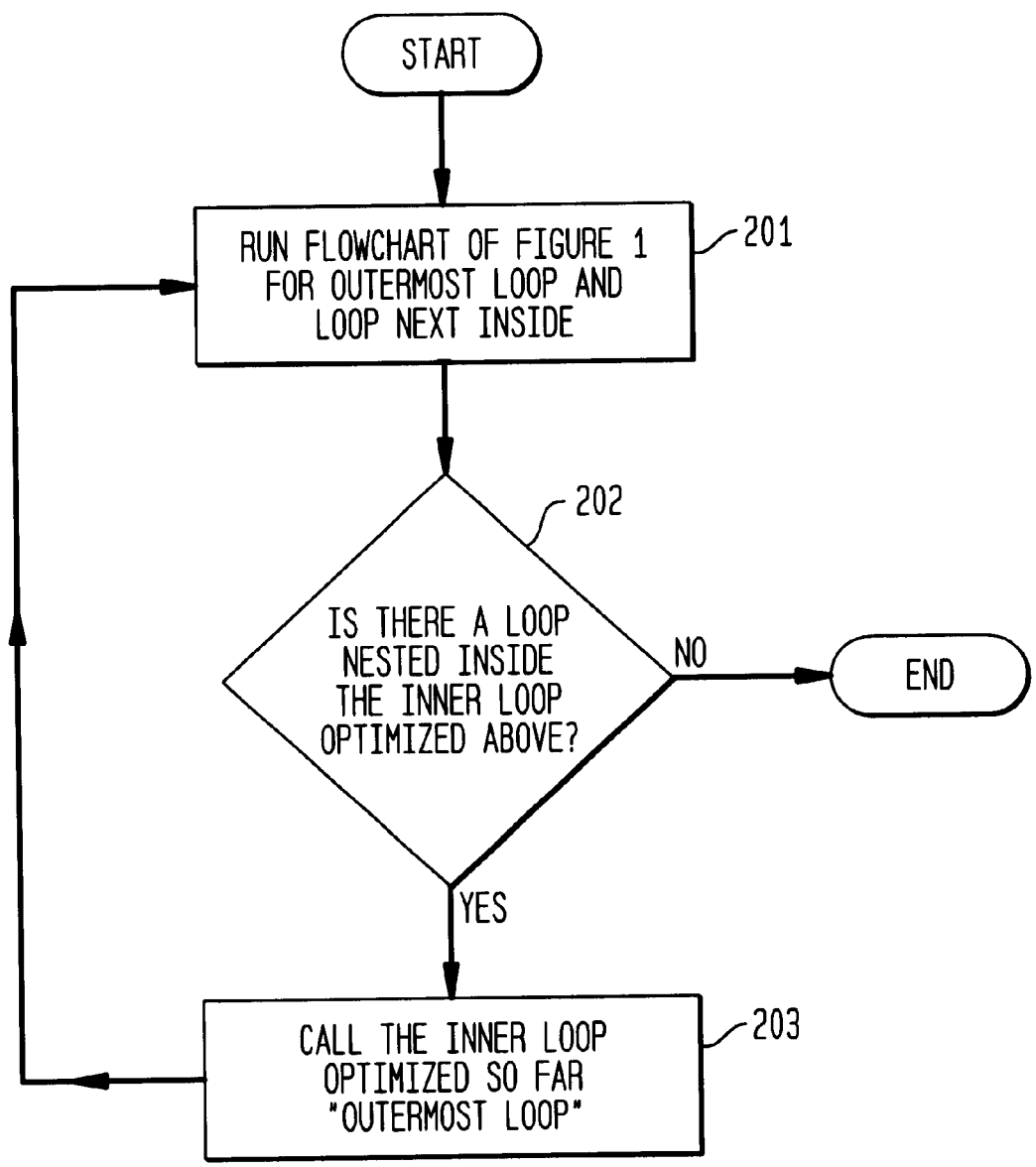
FIG. 2 is a flowchart describing the steps for outer loop unrolling any depth nest with constant bounds, even those having imperfect code.

FIG. 2 is a flowchart describing the steps for optimizing any depth nest with constant bounds, even those having imperfect code. When identified, the outermost loop is outer loop unrolled in a manner as described in FIG. 1, step 201. This process is exited if there is no two deep or greater loop nest residing within the current outer loop nest, step 202. Otherwise, the process is repeated with loops further in, step 203.

Another aspect of the present invention pertaining to practicing outer loop unrolling for linear convex bounds and two deep nests is now described. Linear convex implies that for a loop in the form:

```
DO i=N1, N2
    DO j=L(i), U(i)
    ...
    ENDDO
ENDDO
```

L(i) can be any linear function of "i" or the MAX of any of those; and U(i) may be any linear function of "i" or the MIN of those. The following nested loop illustrates the general case of non-constant bounds:

```
DO i=Li, Ui
    S1(i)
    DO j=L(i), U(i)
        S(i,j)
    ENDDO
    S2(i)
ENDDO
```

Figure 3:
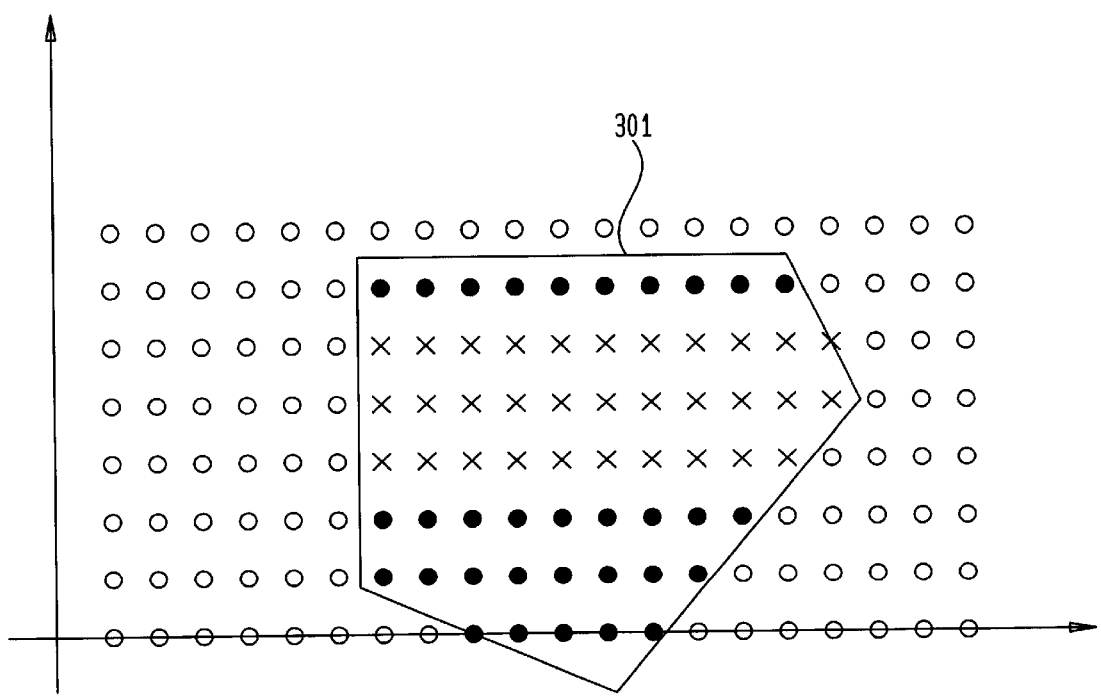
FIG. 3 shows a graph of the iteration space corresponding to a nested loop that has non-constant bounds.

Suppose that the above nested loop has non-constant bounds according to the iteration space graph shown in FIG. 3. The convex polyhedron 401 indicates which nodes are executed. More specifically, the white nodes are not executed. The crosses represent the execution of S1 and/or S2 in addition to S. The black nodes just execute S. Although tiling formulas may be used to construct the loop bounds, this approach does not tell us when the blocksize is maximal (i.e., when unrolling can be performed) and thus is useless for outer loop unrolling. Instead, the present invention traverses the iteration space according to appropriate patterns such that the unrolling scheme is always known. Unrolling is legal as long as S(i,j) is executed before S(i+1,j) and S(i,j) is executed before S(i,j+1); and provided that the imperfectly nest portions are executed with the corresponding first iteration. In addition, it must be ensured that Lj(i)<=Uj(i) for all "i" in [Li,Ui]. The goal then is to demonstrate an ordering that obeys the constraint that S(i,j) executes before both S(i,j+1) and S(i+1,j); that is such that imperfect code is executed with the corresponding first iteration of the next inner loop; and is such that it is easy to know when exactly B iterations of the outer loop (where B is the amount to unroll) are available, so that amount can be unrolled.

In this case, the inner loop is the "j" loop, with multiple "i" iteration at a time in that particular loop.

```
DO i=Li,Ui−B+1,B
    L**=min(L(i), . . . ,L(i+B−1))
    L*=max(L(i), . . . ,L(i+B−1))+1
    U*=min(U(i), . . . ,U(i+B−1))−1
    U**=max(U(i), . . . ,U(i+B−1))
    IF (L*.le.u*) THEN
        /*large strip execution discussed below*/
    } ELSE {
        /*small strip execution discussed below*/
    ENDIF}
ENDDO
/*the "wind-down" loop: few iterations*/
DO i− i,Ui
    S1(i)
    DO j=L(i),U(i)
        S(i,j)
    ENDDO
    S2(j)
ENDDO
```

Note that in the top line of this code, the "i" loop is stepped through by B, which is the amount that unrolling is being attempted. Note that B is not a variable; it is a number chosen by the compiler (e.g., 2 or 3). At this point, it is not known whether outer unroll can even be accomplished or not. But the algorithm attempts to execute i=Li through i=Li+B−1 in an unrolled fashion. Then, the next iteration of the loop is tried: i=Li+B to i=Li+2B−1, etc.

Next, based on the code, L* is made to be the smallest iteration of "i" that has no imperfect code. This is due to the observation that imperfect code can only occur on a boundary. The code has made L* bigger than the entire left-hand edge. Likewise, for U*, it is smaller than the entire right-hand edge. Hence, if L*<=U*, then there is some range of "i" that has no imperfect code. The IF condition in the code testes whether there exists any range of "i" where there is no imperfect code. If so, then "j" is constant in that region, and unroll and jam is performed for that particular portion of the code. This is referred to as the "large strip execution."

However, there may be instances in the code where there is some imperfect code for "i" between "i" and i+B−1. When this situation is encountered, the code is not unrolled at all. Instead, the code is simply executed in some legal way, known as "small strip execution." The small strips are executed without tiling as follows. The small strips are executed in the same order that corresponds to their original, untransformed program. This is analogous to the wind-down code. The code is executed as it was originally written.

```
/* small strip execution*/
DO i'=i,i+B−1
    S1(i')
    DO j=L(i'),U(i')
        S(i',j)
    ENDDO
    S2(i')
ENDDO
```

For, the large strips, unrolling is performed between L* and U*. Before L* and after U*, the loop is run without unrolling. In other words, the following loop is generated only if L**<L*. The point is that the code between L* and U* may be unrolled, but L* is not necessarily the smallest value of "j." All the smaller "j"s are executed in the original program order.

```
       /* large strip execution part one: j<L* */
       DO i'=i,i+B-1
           S1(i')
           DO j=L(i'),L*-1
               S(i',j)
           ENDDO
       ENDDO
       /* large strip execution part two: unrolled code*/
       DO j=L*,U*
           S(i,j); . . . ;S(i+B-1,j)
       ENDDO
       /* large strip execution part three: j-<U* */
       DO i'=i,i+B-1
           DO j=U*+1,U(i')
               S(i',j)
           ENDDO
           S2(i')
       ENDDO
```

In summary, chunks of "i" code are executed B size at a time. If there is a region of "j's" that do not have boundaries, they are isolated in a rectangular region and executed unrolled. All other code is executed in the normal order. Hence, with the present invention, all two-deep integer non-degenerate convex loops can be unrolled, subject to dependence constraints. By utilizing the transformation technique according to the present invention, compilers may now unroll a far larger class of loop nests. In fact, an extremely broad range of loops, by far all the important common cases (e.g., any two-deep loop with any convex bounds, and any deeper nest with non-varying bound, even if imperfectly nested) may now be outer loop unrolled.

To summarize, the most general two-deep loop is:

```
       DO i=Li, Ui
           S1(i)
           DO j=L(i), U(i)
               S2(i,j)
           ENDDO
           S3(i)
       ENDDO
```

Simplifications arise if there is no S1(i) or S3(i). Likewise, simplifications arise if L(i), U(i), or both are constant. However, without these simplifications, the code given below results in outer unrolled loops.

```
       DO i = Li, Ui - B+1, B
           LXX = min (L (i), . . . , L(i+B-1))
           LX=max (L (i) , . . . ,L(i+B-1)) +1
           UX=min (U (i), . . . , U (i+B-1) ) -1
           UXX=max (U (i), . . . , U (i+B-1))
           IF (LX .LE. UX) THEN
               /*large strip execution*/
               DO i1=i, i+B-1
                   S1 (i1)
                   DO j=L (i1), LX-1
                       S (i1,j)
                   ENDDO
               ENDDO
               DO j=LX, UX
                   S (i,j)
                   . . .
                   S(i+B-1,j)
               ENDDO
               Do i1=i, i+B-1
                   DOj = UX+1, U (i1)
                       S (i1,j)
                   ENDDO
                   S2 (i1)
               ENDDO
           ELSE
               /*small strip execution*/
               DO i1 = i, i+B-1
                   S1 (i1)
                   DO j=L(i1, U (i1)
                       S(i1,j)
                   ENDDO
                   S2 (i1)
               ENDDO
           ENDIF
       ENDDO
       DO i= i,Ui
       ENDDO
```

Figure 4:
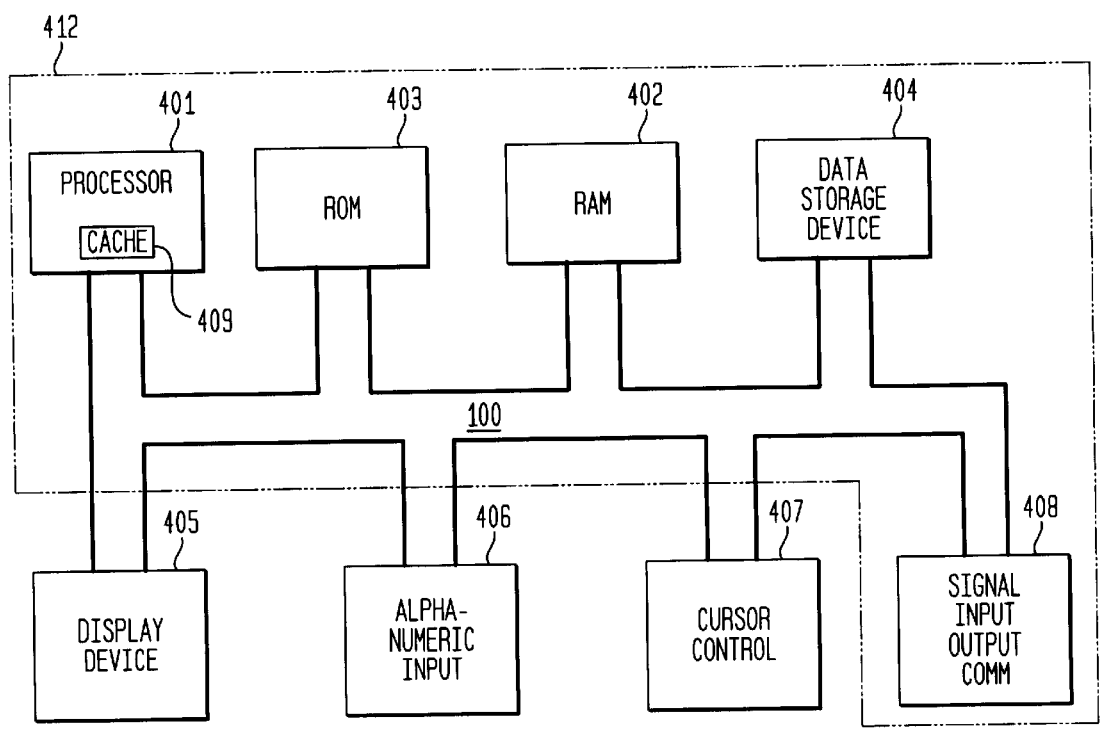
FIG. 4 shows an exemplary computer system upon which the present invention may be practiced.

Referring to FIG. 4, an exemplary computer system 412 upon which the present invention may be practiced is shown. It is appreciated that the computer system 412 of FIG. 4 is exemplary only and that the present invention can operate within a number of different computer systems including general purpose computers, embedded computes, portable computers, and computer systems specially adapted for graphics display. Computer system 412 of FIG. 4 includes an address/data bus 400 for communicating information between the various components. A central processor unit 401 is coupled to the bus 400. It is used for processing information and instructions. Also coupled to bus 400 is a random access memory 402 (e.g., DRAM) for storing information and instructions for the central processor 401. A small cache memory 409 resides within microprocessor 401. Processor 401 reads data from and writes data to cache 409. Occasionally, data from main memory 402 is loaded into cache 409 and the main memory 402 is updated with the most recent data from cache 409. A read only memory (ROM) 403 is used for storing semi-permanent information and instructions for the processor 401. The compiler may be stored within ROM 403. For storing vast amounts of data, a data storage device 404 (e.g., a magnetic or optical disk and disk drive) is coupled to bus 400. Finally, an I/O unit 408 is used to interface the computer system 412 with external devices (e.g., keyboard, modem, network interface, display, mouse, etc.). Externally, a display device 405 is coupled to bus 400 for displaying information (e.g., graphics, text, spreadsheets, etc.) to a computer user. An alphanumeric input device 406 (e.g., a keyboards is used for communicating information and command selections to the central processor 401. Optionally, a cursor control device 407 (e.g., a mouse, trackball, etc.) is used for communicating user input information and command selections to the central processor 401.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a compiler for optimizing source code, a method for unrolling a two-deep loop nest of source code having constant bounds and imperfectly nested code, comprising the steps of:

transforming the two-deep loop nest into adjacent two-deep loop nests comprising a first two-deep loop nest, a second two-deep loop nest and a third two-deep loop nest, wherein said first two-deep loop nest handles the imperfectly nested code above an inner loop, said second two-deep loop nest contains only perfectly nested code, and wherein said third two-deep nest handles imperfectly nested code below said inner loop;

unrolling said second two-deep loop nest to produce an unrolled section of code and a wind-down section of code;

jamming said unrolled section of code; and recursively repeating said transforming, said unrolling, and said jamming steps from the outermost to innermost loops in order to outer-unroll loop nests of depth greater than two.

2. In a compiler for compiling source code that includes two-deep loop nests having linear convex bounds and imperfectly nested code, a method comprising the steps of:

stripping an outer loop into constant sized blocks, wherein said constant sized blocks do not contain any imperfectly nested code;

performing large strip execution for said constant sized blocks;

performing small strip execution for code falling outside said constant sized blocks; and executing a wind-down loop.

3. The method of claim 2 further comprising the steps of:

determining a smallest iteration of said wind-down loop which does not contain any imperfect code;

determining a largest iteration of said wind-down loop which does not contain any imperfect code; and performing an unroll and jam operation on code residing between said smallest iteration and said largest iteration which do not contain any imperfect code.

4. The method of claim 2, wherein said code corresponding to said small strip execution step is executed according to an original untransformed source code.

5. The method of claim 2, further comprising the step of optimizing an inner loop having multiple "i" iterations as according to:

DO i=Li,Ui−B+1,B $L^{**}=\min(L(i),\ldots,L(i+B-1))$ $L^{*}=\max(L(i),\ldots,L(i+B-1))+1$ $U^{*}=\min(U(i),\ldots,U(i+B-1))-1$ $U^{**}=\max(U(i),\ldots,U(i+B-1))$ wherein if $L^{*}<=U^{*}$ then said large strip execution step is performed, else said small strip execution step is performed.

6. A computer-readable medium product having stored thereon with computer-readable instructions for implementing a compiler means on a computer for optimizing source code, a multiple loop nest of source code having constant bounds and which is imperfectly nested residing within only one of the loops, wherein the multiple loop nest of source code is unrolled by the compiler means, the compiler means comprising:

means for transforming the multiple loop nest into a first two-deep loop and a second two-deep loop, wherein said first two-deep loop handles imperfectly nested code and said second two-deep loop contains only perfectly nested code;

means for unrolling said second two-deep loop to produce an unrolled section of code; and means for jamming said unrolled section of code, wherein said imperfectly code resides both above and below said second two-deep loop of the multiple loop nest.

* * * * *

UNITED STATES PATENT AND TRADEMARK OFFICE
CERTIFICATE OF CORRECTION

PATENT NO. : 6,567,976 B1
DATED : May 20, 2003
INVENTOR(S) : Michael Wolf

It is certified that error appears in the above-identified patent and that said Letters Patent is hereby corrected as shown below:

<u>Title page,</u>
Item [56], References Cited, U.S. PATENT DOCUMENTS, please add the following cited references:
-- U.S. Pat. No. 5,797,013
   U.S. Pat. No. 5,845,126 --

<u>Column 2,</u>
Line 64, "(N1-i)" should be deleted and replaced with -- (N1-1) --; and <u>Column 5,</u>
Lines 14-19, should be deleted and replaced with the following formula:

```
       DO i=1,4

DO j=1,1 if (j .eq.1) then c(i)=c(i)+3 a(i)=a(i)+b(j)

ENDDO

ENDDO

DO i=1,4

DO j=2,7
```

UNITED STATES PATENT AND TRADEMARK OFFICE
CERTIFICATE OF CORRECTION

PATENT NO. : 6,567,976 B1
DATED : May 20, 2003
INVENTOR(S) : Michael Wolf

It is certified that error appears in the above-identified patent and that said Letters Patent is hereby corrected as shown below:

<u>Column 5 (cont'd),</u>
                if (j .eq. 1) then $c(i)=c(i)+3$ $a(i)=a(i)+b(j)$

ENDDO

ENDDO

Signed and Sealed this

Ninth Day of December, 2003

JAMES E. ROGAN
*Director of the United States Patent and Trademark Office*